(12) United States Patent
Gaspard et al.

(10) Patent No.: US 8,464,041 B2
(45) Date of Patent: Jun. 11, 2013

(54) OPTIMIZATION OF STORAGE DEVICE OPERATING PARAMETERS

(75) Inventors: Walter A. Gaspard, Magnolia, TX (US); Scotty M. Wiginton, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 12/788,126

(22) Filed: May 26, 2010

(65) Prior Publication Data

US 2011/0296153 A1  Dec. 1, 2011

(51) Int. Cl.
*G06F 1/24* (2006.01)

(52) U.S. Cl.
USPC .............................. 713/100; 713/2; 717/151

(58) Field of Classification Search
USPC ...................... 713/2, 100; 717/151
See application file for complete search history.

(56) References Cited

U.S. PATENT DOCUMENTS

| | | | | |
|---|---|---|---|---|
| 5,535,355 | A * | 7/1996 | Scales | 711/101 |
| 7,126,778 | B2 * | 10/2006 | Lamberts | 360/69 |
| 7,500,153 | B2 | 3/2009 | Jun | |
| 8,117,469 | B2 * | 2/2012 | Schmitz et al. | 713/300 |
| 2006/0271733 | A1 | 11/2006 | Noble | |
| 2008/0294421 | A1 * | 11/2008 | Leung | 703/25 |
| 2009/0106969 | A1 | 4/2009 | Ang et al. | |

FOREIGN PATENT DOCUMENTS

TW 200744075 12/2007

OTHER PUBLICATIONS

English Abstract of TW200744075, 2 pages.

\* cited by examiner

*Primary Examiner* — Thuan Du

(57) ABSTRACT

Example embodiments relate to storage devices, computing devices, and machine-readable storage media that optimize storage device operating parameters for desktop and notebook computing devices. Example embodiments allow for optimization of operating parameters of a storage device for one of a desktop computing device and a notebook computing devices based on provision of a command to the storage device. In example embodiments, upon receipt of such a command, the storage device may reconfigure its operating parameters to be optimized for the particular type of system.

18 Claims, 5 Drawing Sheets

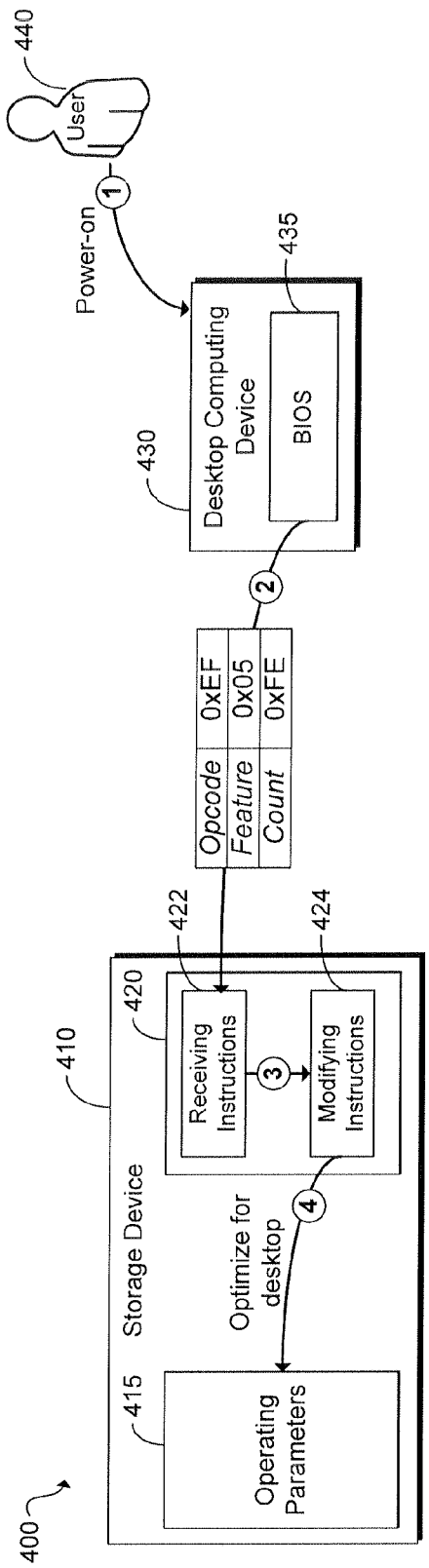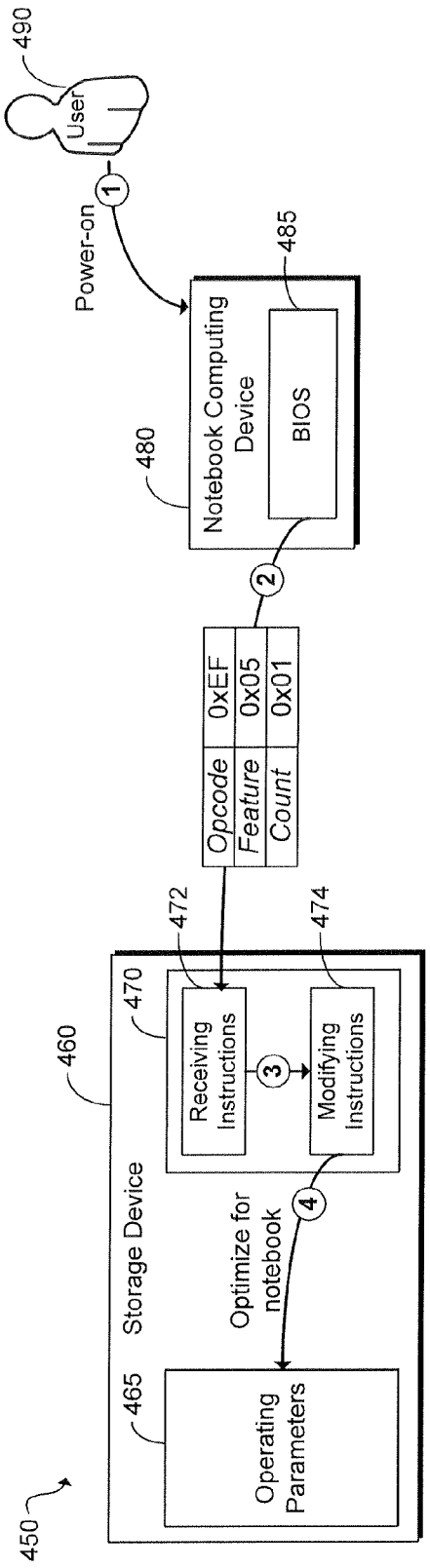

OPTIMIZATION OF STORAGE DEVICE OPERATING PARAMETERS

BACKGROUND

In existing implementations, storage devices are designed for use in either notebook or desktop computers. As a result, an original equipment manufacturer (OEM) that produces both types of systems must typically purchase different drives for inclusion in each type of system. This increases the cost per unit paid by the OEM and thereby undermines the ability of the OEM to rely on efficient economies of scale.

BRIEF DESCRIPTION OF THE DRAWINGS

In the accompanying drawings, like numerals refer to like components or blocks. The following detailed description references the drawings, wherein:

FIG. 4A is a block diagram of an example operation flow for optimizing operating parameters of a storage device for a desktop computing device; and FIG. 4B is a block diagram of an example operation flow for optimizing operating parameters of a storage device for a notebook computing device.

DETAILED DESCRIPTION

In current implementations, storage devices are generally designed for use with either a desktop computing device or a notebook computing device, but not both. To address this issue, example embodiments allow for use of the same storage device in either a desktop computing device or a notebook computing device. Furthermore, example embodiments alleviate the requirement of developing multiple firmware configurations and part numbers for the same storage device when the device will be used in different types of systems.

In particular, as described in detail herein, example embodiments allow for optimization of operating parameters of a storage device for either a desktop computing device or a notebook computing device based on receipt of a command in the storage device. In example embodiments, upon receipt of such a command, the storage device may reconfigure its operating parameters to be optimized for a particular type of system. In this manner, an OEM may utilize a storage device of a single form factor in both system types, while obtaining the benefits of a device that is optimized for the type of system in which it is currently installed. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
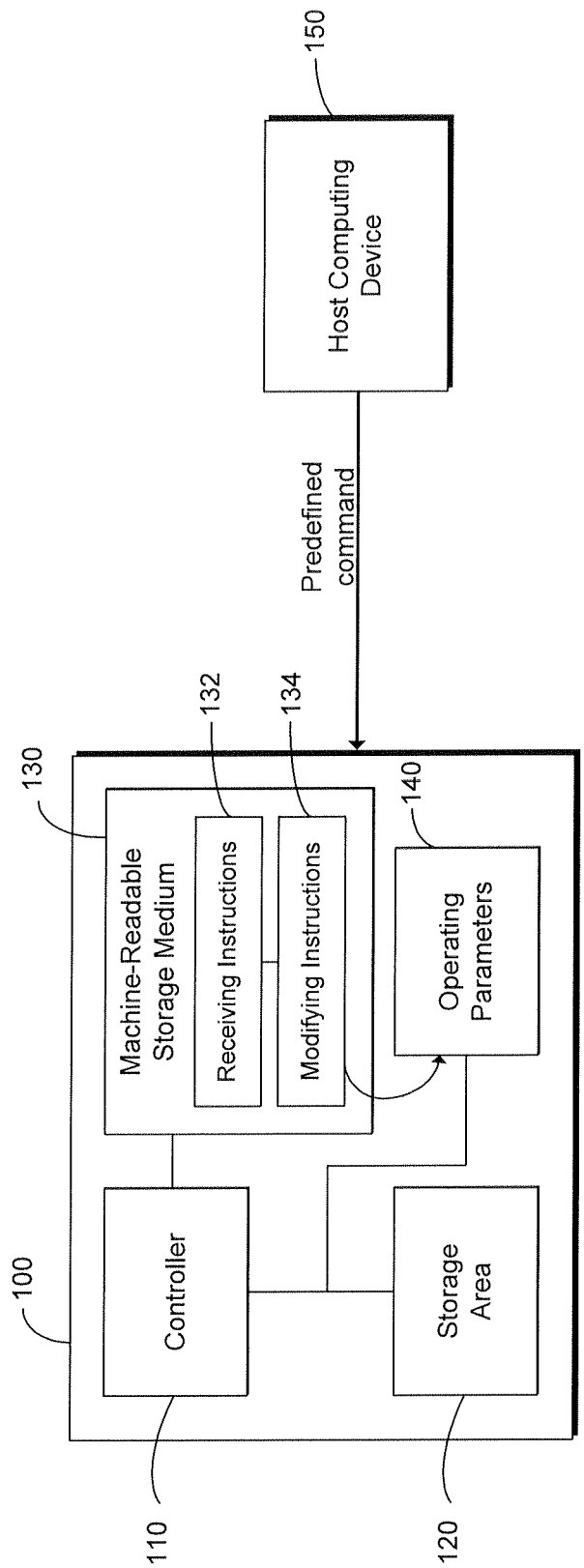
FIG. 1 is a block diagram of an example storage device that optimizes operating parameters for desktop and notebook computing devices.

Referring now to the drawings, FIG. 1 is a block diagram of an example storage device 100 that optimizes operating parameters 140 for desktop and notebook computing devices. As illustrated, a storage device 100 may be in communication with a host computing device 150 and, as described in detail below, may receive a predefined command that instructs storage device 100 to modify its operating parameters 140 to be optimized for the form factor of host computing device 150.

Storage device 100 may be, for example, a hard disk drive, a solid state drive, a nanodrive, a holographic storage device, or any other storage device that may provide data storage capability to a host computing device 150. Furthermore, storage device 100 may be configured in any of a number of form factors. As one example, storage device 100 may be in a form factor that allows for installation in both desktop and notebook computing devices. As a specific example, storage device 100 may be a 2.5" drive designed for use in a notebook computing device, but also suitable for installation in a desktop computing device. As illustrated in FIG. 1, storage device 100 may include a controller 110, a storage area 120, a machine-readable storage medium 130, and a set of operating parameters 140.

Controller 110 of storage device 100 may include electrical circuitry that executes logic for managing storage device 100. For example, controller 110 may be a processor, a semiconductor-based microprocessor, a microcontroller, or any other hardware device suitable for retrieval and execution of instructions stored in machine-readable storage medium 130. Controller 110 may fetch, decode, and execute instructions 132, 134 to implement the parameter optimization functionality described herein.

Storage area 120 of storage device 100 may comprise a number of physical media for storing data under the direction of controller 110 and host computing device 150. For example, storage area 120 may comprise a number of disks of a hard disk drive, one or more Electrically Erasable Programmable Read-Only Memory (EEPROM) or other chips, or any other physical media for storing data.

Machine-readable storage medium 130 may be an electronic, magnetic, optical, or other physical device that contains or stores executable instructions for managing operating parameters 140 of storage device 100. As an example, machine-readable storage medium 130 may be a Read-Only Memory (ROM) chip that encodes instructions that are executable to implement the firmware of storage device 100. Controller 110 may execute the instructions encoded on machine-readable storage medium 130 to implement the functionality described in detail below.

Machine-readable storage medium 130 may include receiving instructions 132, which may receive commands from host computing device 150. In particular, receiving instructions 132 may receive a predetermined command instructing storage device 100 to modify its operating parameters to be optimized for the particular configuration of host computing device 150, which may be either a desktop computing device or a notebook computing device.

Any of a number of possible command formats may be used for the command sent by host computing device 150 and received by receiving instructions 132. For example, the command may be defined in a standard that governs the implementation of storage devices, such as the Advanced Technology Attachment (ATA) standard. As described below in connection with modifying instructions 134, in such embodiments, the command may trigger modification of parameters in addition to those that are modified in accordance with the standard. In this manner, storage device 100 may implement additional functionality to optimize its operation for a particular type of computing device without diverging from the standard.

To give a more specific example, suppose the command provided by host computing device 150 to receiving instructions 132 is the "Set Features" command (opcode "0xEF") defined in the ATA standard. When the subcommand code is "0x05," this indicates to storage device 100 that advanced power management is enabled. The count field of the command may then be utilized to specify a power consumption setting between "0x01" (minimum power consumption) and "0xFE" (maximum performance). In such embodiments, the power consumption setting "0x01" may indicate to storage device 100 that it should optimize its operating parameters 140 for a notebook computing device, while the setting "0xFE" would correspond to optimization for a desktop computing device. As described in detail below, modifying instructions 134 may then make a number of changes to the operating parameters 140 that are not specified in the ATA standard. In essence, the additional functionality would be "piggybacked" onto the ATA command.

As an alternative to utilizing a command defined in a storage device standard, the command used to instruct modification of operating parameters 140 may instead be a proprietary command. In this manner, storage device 100 may be instructed to optimize its operating parameters 140 without the use of a command defined in a standard.

In addition to the type of command used (i.e., standard or proprietary), storage device 100 may also use different methods for triggering modifying instructions 134. In some embodiments, a first command may instruct storage device 100 to modify operating parameters 140 to be optimized for a desktop computing device, while a second command may instruct storage device 100 to modify operating parameters 140 to be optimized for a notebook computing device. In this manner, host computing device 150 may simply provide the command appropriate for its configuration (i.e., desktop or notebook) to storage device 100 upon power-on (e.g., boot-up, resume from sleep, resume from hibernation, etc.). It should be noted that the first and second commands may be differentiated based on their opcode, parameters, or a combination of the two.

Alternatively, a single command may be used to notify storage device 100 to modify its settings for a non-default type of computing device. For example, storage device 100 may be configured by default for a notebook computing device and, upon receipt of the command, launch modifying instructions 134 to optimize operating parameters 140 for a desktop computing device. Conversely, storage device 100 may be configured by default for a desktop computing device and, upon receipt of the command, launch modifying instructions 134 to optimize operating parameters 140 for a notebook computing device.

It should be noted, however, that even in embodiments in which two different commands are used, storage device 100 may still be optimized by default for a particular type of computing device. In such embodiments, upon receipt of a command requesting optimization for a computing device that matches its current configuration, storage device 100 may simply ignore the command.

In addition to receiving instructions 132, machine-readable storage medium may include modifying instructions 134, which may modify operating parameters 140 to be optimized for the system type identified by receiving instructions 132. In optimizing operating parameters 140, modifying instructions 134 may rely on a number of environmental conditions that generally differ between desktop and notebook computing devices. In particular, while a desktop generally has access to a constant power source, a notebook may often rely on battery power. In addition, a desktop generally remains stationary during its use, while a notebook may be moved while in use and is therefore subject to vibrations and other physical impact. Similarly, while a desktop is generally operated indoors at a relatively constant temperature, a notebook may be exposed to widely-varying temperatures.

Accordingly, when optimizing operating parameters 140 for a desktop computing device, modifying instructions 134 may enable an offline scanning feature (e.g., a background media scan feature) of storage device 100 given the constant power source. Also, because a desktop generally remains stationary and therefore experiences fewer vibrations, modifying instructions 134 may attempt to improve performance by adjusting servo control settings (e.g., loosening the seek threshold setting) and caching algorithms (e.g., increasing the time for initiating a background write cache flush). Similarly, because a desktop generally remains indoors at a stable temperature and in a stationary location, modifying instructions 134 may loosen head and media parameters for improved performance.

In contrast, when optimizing operating parameters 140 of storage device 100 for a notebook computing device, modifying instructions 134 may disable offline scanning to save battery life. Similarly, given the potential for movement of the notebook, storage device 100 may tighten seek threshold settings and shorten the time for initiating a background write cache flush. Finally, because the temperature of the notebook may fluctuate due to a change in location, storage device 100 may attempt to minimize data misreads by changing the head and media parameters to increase the margin required for a clean read signal.

Operating parameters 140 may include a number of fields and corresponding settings that control the low-level operation of storage device 100. Although illustrated as separate from machine-readable storage medium 130, in some embodiments, operating parameters may be maintained on medium 130. As described above, modifying instructions 134 may change a number of settings in operating parameters 140 to optimize the operation of storage device 100 for a particular type of computing device based on receipt of a predetermined command by receiving instructions 132.

Host computing device 150 may be, for example, a desktop computer or a notebook computer. As used herein, the term "desktop" may refer to any computing device intended for regular use at a single location, such as a tower, a touchscreen computer (e.g., an HP TouchSmart®), an all-in-one system, and the like. Conversely, the term "notebook" may refer to any computing device designed for portability, such as a laptop computer, a slate or tablet computer, a mobile phone, an electronic book reader, and the like. As illustrated, host computing device 150 may be coupled to storage device 100. In some embodiments, storage device 100 is an internal component of host computing device 150. In such embodiments, the environmental conditions affecting computing device 150 (e.g., power availability, movement, temperature, etc.) may also affect storage device 100. Thus, as detailed above, storage device 100 may be optimized based on assumptions regarding the conditions that affect desktop and notebook computing devices.

Figure 2:
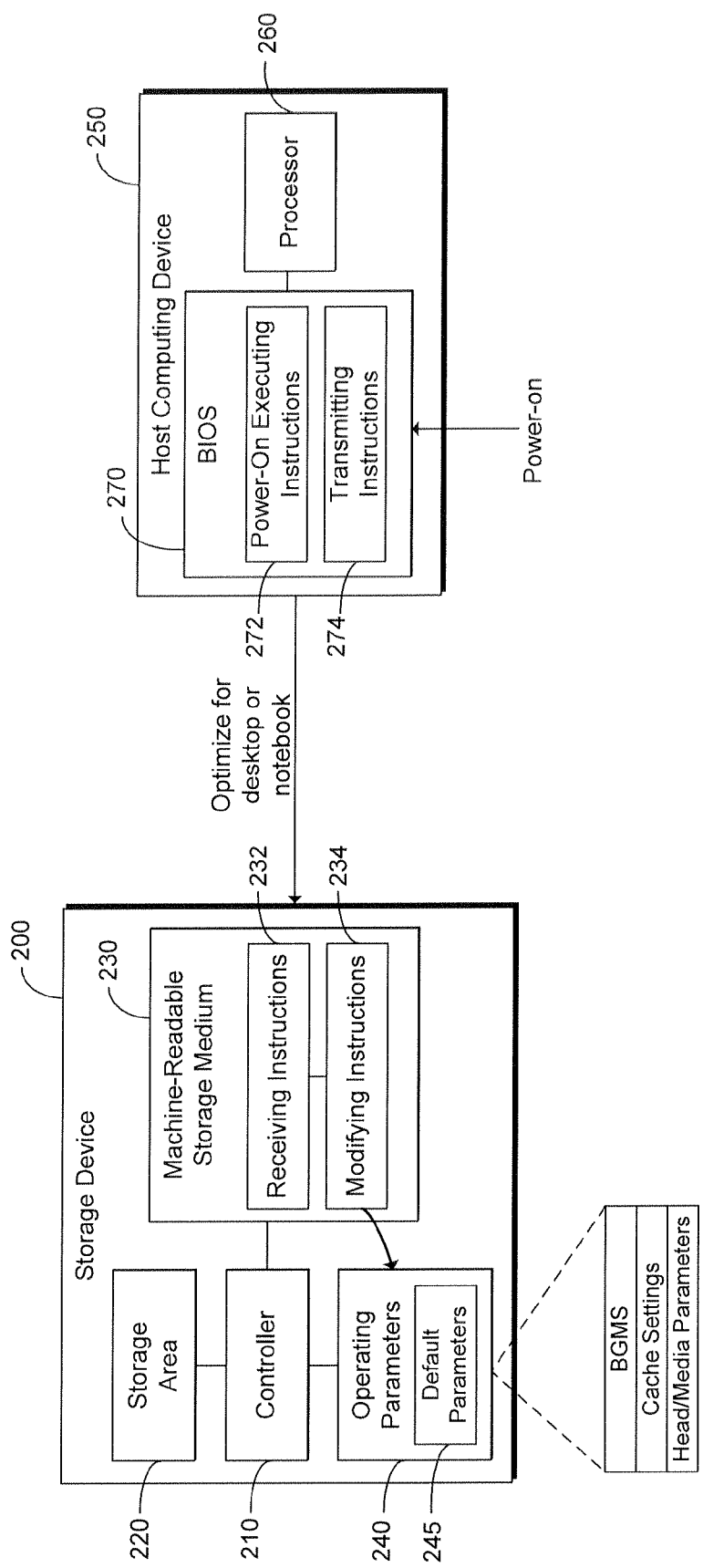
FIG. 2 is a block diagram of an example storage device in communication with a host computing device for optimization of operating parameters of the storage device.

FIG. 2 is a block diagram of an example storage device 200 in communication with a host computing device 250 for optimization of operating parameters 240 of the storage device 200. As illustrated in FIG. 2 and described in further detail below, a computing device 250 may provide a predetermined command to storage device 200 and, in response, storage device 200 may optimize its operating parameters 240 for the particular computing device 250.

As detailed above in connection with storage device 100 of FIG. 1, storage device 200 may be any device that provides data storage capability to a host computing device 250. As with controller 110 of FIG. 1, controller 210 may be a processor, a semiconductor-based microprocessor, a microcontroller, or any other hardware device suitable for retrieval and execution of instructions stored in machine-readable storage medium 230. As with storage area 120, storage area 220 may comprise a number of physical media for storing data under the direction of controller 210 and host computing device 250. In addition, machine-readable storage medium 230 may be an electronic, magnetic, optical, or other physical device that contains or stores executable instructions for optimizing operating parameters 240 for the coupled host computing device 250.

As with machine-readable storage medium 130 of FIG. 1, storage medium 230 may include receiving instructions 232 and modifying instructions 234. Receiving instructions 232 may receive a predetermined command instructing storage device 200 to modify its operating parameters 240 to be optimized for the particular configuration of host computing device 250, which may be either a desktop computing device or a notebook computing device. In response to receipt of a command by receiving instructions 232, modifying instructions 234 may modify operating parameters 240 to be optimized for the system type identified by receiving instructions 232. Further implementation details regarding example embodiments of receiving instructions 232 and modifying instructions 234 are provided in detail above in connection with instructions 132, 134 of FIG. 1.

Operating parameters 240 may include a number of fields and corresponding settings that control the low-level operation of storage device 200. As illustrated, example fields maintained in operating parameters 240 may include enablement of background media scanning (BGMS), cache settings, and head/media parameters. Other suitable fields included in operating parameters 240 will be apparent to those of skill in the art. As described above, modifying instructions 234 may change a number of settings in operating parameters 240 to optimize the operation of storage device 200 for a particular type of computing device based on receipt of a predetermined command by receiving instructions 232.

In some embodiments, default parameters 245 may be a set of values for operating parameters 240 that are stored in a storage medium of storage device 200 and are applied upon power-up of storage device 200. For example, default parameters 245 may be maintained in firmware of storage device 200 and, upon receipt of power by storage device 200, may be used to configure operating parameters 240. In some embodiments, default parameters 245 may be optimized for either a desktop or notebook computing device. In this manner, when storage device 200 is installed in the type of system for which default parameters 245 are optimized, the host computing device 250 need not transmit a parameter optimization command upon power-on.

As described above in connection with host computing device 150 of FIG. 1, host computing device 250 may be, for example, a desktop computer or a notebook computer. Host computing device 250 may include, for example, storage device 200, processor 260, and a Basic Input/Output System 270 including instructions for optimizing storage device 200 for the particular configuration of host computing device 250.

Processor 260 may be a central processing unit (CPU), a semiconductor-based microprocessor, or any other hardware device suitable for retrieval and execution of the instructions of BIOS 270. In particular, processor 260 may fetch, decode, and execute instructions 272, 274 to implement the storage device optimization functionality described herein.

BIOS 270 may be a legacy Basic Input/Output System, a Unified Extensible Firmware Interface (uEFI) BIOS, or any other BIOS implementation that will be known to those of skill in the art. BIOS 270 may include instructions encoded on a machine-readable storage medium executable by processor 260. In particular, BIOS 270 may include instructions that may be executed to configure hardware of host computing device 250, including storage device 200.

More specifically, BIOS 270 may include power-on executing instructions 272, which may execute a power-on procedure to configure hardware of computing device 250. Power-on executing instructions 272 may be executed, for example, upon initiation of a boot procedure, a resume from standby, or a resume from hibernation of host computing device 250. In response to occurrence of such an event, power-on executing instructions 272 may initialize the hardware configuration procedure.

BIOS 270 may also include transmitting instructions 274, which may execute during the power-on procedure. In particular, transmitting instructions 274 may transmit a predetermined command to storage device 200 instructing the storage device 200 to modify its operating parameters 240 to optimize operation for the particular type of host computing device 250.

More specifically, when host computing device 250 is a notebook computing device, transmitting instructions 274 may be configured to transmit a command instructing storage device 200 to optimize its operating parameters 240 for a notebook computing device. Conversely, when host computing device 250 is a desktop computing device, transmitting instructions 274 may be configured to transmit a command instructing storage device 200 to optimize its operating parameters 240 for a desktop computing device. As described in detail above in connection with receiving instructions 232 and modifying instructions 234, storage device 200 may then modify operating parameters 240 in response to the command.

Figure 3A:
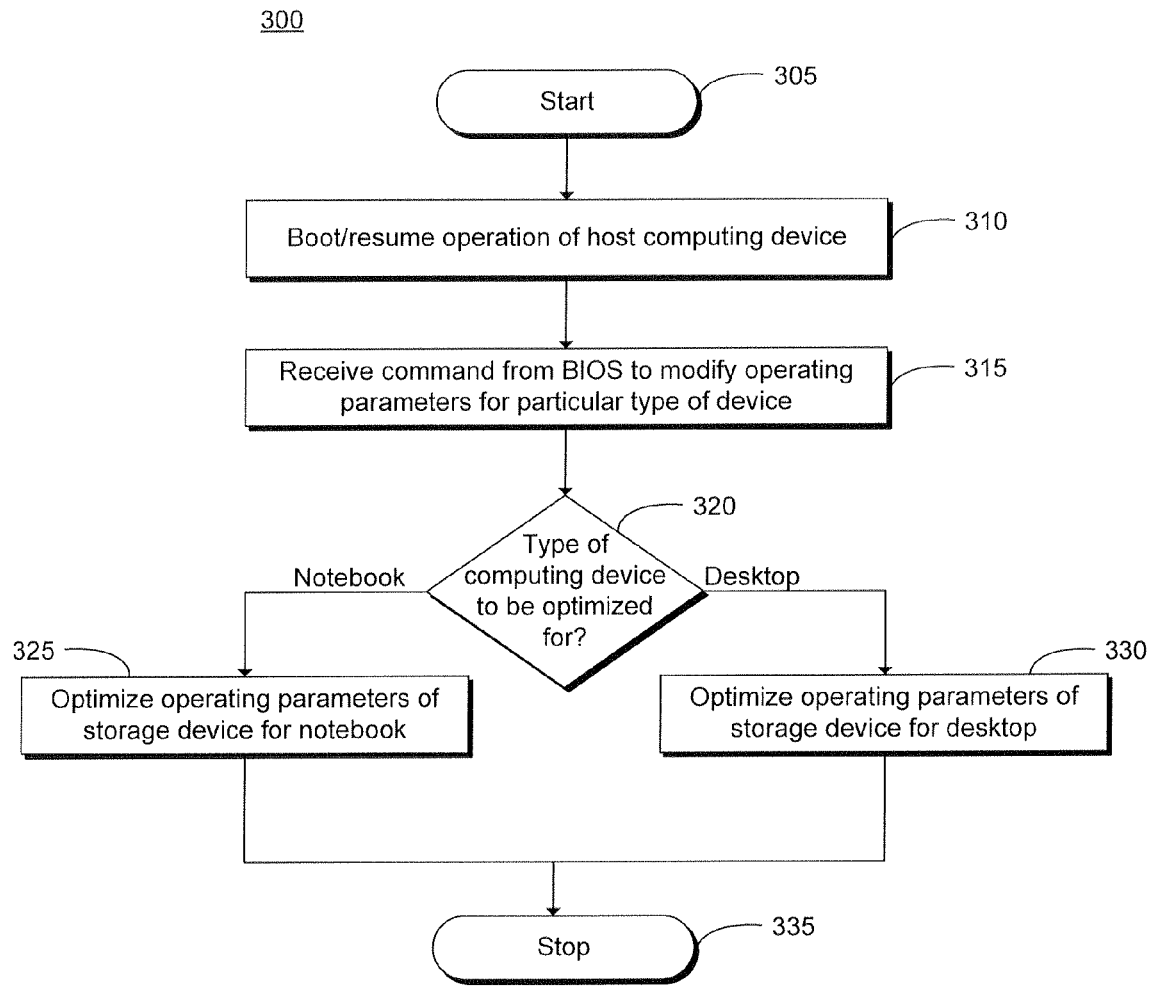
FIG. 3A is a flowchart of an example method for optimizing operating parameters of a storage device based on receipt of a command corresponding to a particular type of computing device.

FIG. 3A is a flowchart of an example method 300 for optimizing operating parameters of a storage device 200 based on receipt of a command corresponding to a particular type of computing device 250. Although execution of method 300 is described below with reference to storage device 200 and computing device 250, other suitable components for execution of method 300 will be apparent to those of skill in the art. Method 300 may be implemented in the form of executable instructions stored on a machine-readable storage medium.

Method 300 may start in block 305 and proceed to block 310, where host computing device 250 may be booted, resumed from sleep or hibernation, or otherwise powered-on. In response, BIOS 270 of host computing device 250 may generate and transmit an appropriate command to storage device 200. This command may instruct storage device 200 to optimize its operating parameters 240 for the particular configuration of computing device 250 (i.e., desktop or notebook).

Method 300 may then proceed to block 315, where storage device 200 may receive the command from BIOS 270. As detailed above, BIOS 270 may provide this command during, for example, a boot procedure, a resume from standby, or a resume from hibernation. Storage device 200 may process the command and, in response, determine that BIOS 270 has instructed storage device 200 to optimize its operating parameters 240 for a particular type of computing device.

Thus, method 300 may proceed to block 320, where storage device 200 may determine whether operating parameters 240 are to be optimized for a notebook computing device or a desktop computing device. In particular, storage device 200 may parse the command received from BIOS 270 to determine whether the particular opcode and/or parameters indicate that storage device 200 should optimize its parameters for a desktop or, alternatively, for a notebook. More specifically, a first predetermined command may instruct storage device 200 to optimize its operating parameters 240 for a desktop, while a second predetermined command may instruct storage device 200 to optimize its operating parameters 240 for a notebook.

When it is determined in block 320 that operating parameters 240 are to be optimized for a notebook computing device, method 300 may proceed to block 325. In block 325, storage device 200 may modify its operating parameters 240 to be optimized for a notebook computing device. In particular, storage device 200 may make a number of changes to operating parameters 240 based on the assumption that the notebook computing device and, therefore, storage device 200 may experience movement and vibrations, temperature changes, and limited power availability. Example parameters that may be modified in block 325 are described in detail above in connection with modifying instructions 134, 234 of FIGS. 1 and 2. After modification of the operating parameters 240, method 300 may proceed to block 335, where method 300 may stop.

Alternatively, when it is determined in block 320 that operating parameters 240 are to be optimized for a desktop computing device, method 300 may proceed to block 330. In block 330, storage device 200 may modify its operating parameters 240 to be optimized for a desktop computing device. In particular, storage device 200 may make a number of changes to operating parameters 240 based on the assumption that the desktop computing device and, therefore, storage device 200 will be stationary, operate at a fixed temperature, and have constant power availability. Example parameters that may be modified in block 330 are described in detail above in connection with modifying instructions 134, 234 of FIGS. 1 and 2. After modification of the operating parameters 240, method 300 may proceed to block 335, where method 300 may stop.

Figure 3B:
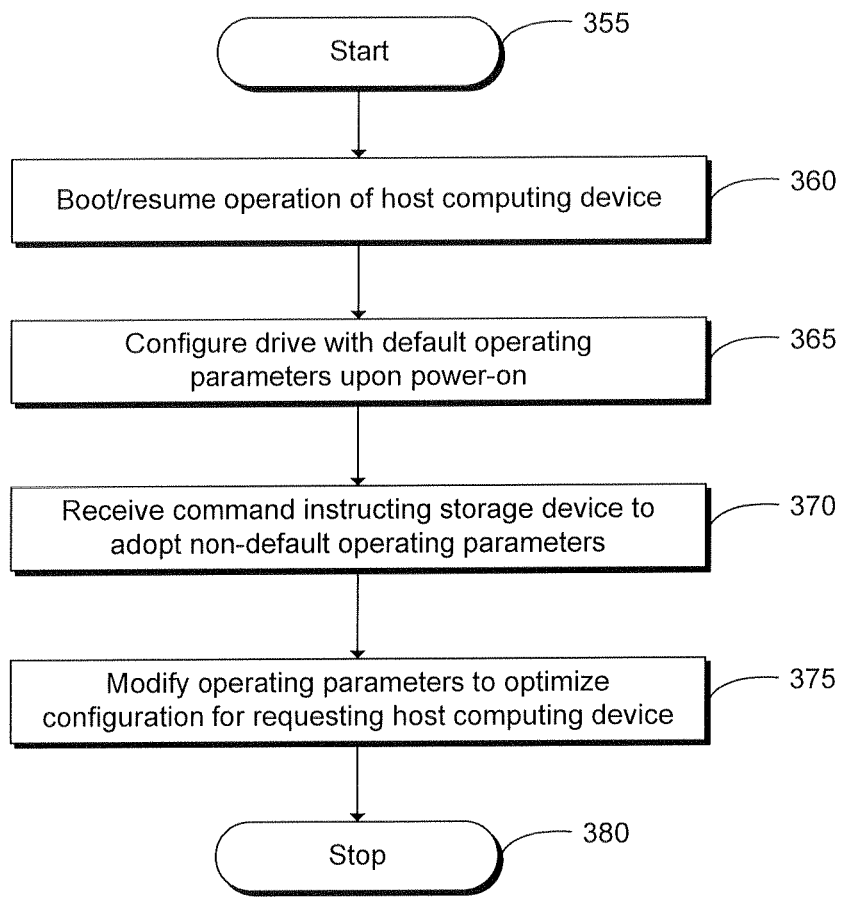
FIG. 3B is a flowchart of an example method for optimizing operating parameters of a storage device for a non-default type of computing device.

FIG. 3B is a flowchart of an example method 350 for optimizing operating parameters of a storage device 200 for a non-default type of computing device 250. Although execution of method 350 is described below with reference to storage device 200 and computing device 250, other suitable components for execution of method 350 will be apparent to those of skill in the art. Method 350 may be implemented in the form of executable instructions stored on a machine-readable storage medium.

Method 350 may start in block 355 and proceed to block 360, where host computing device 250 may be booted, resumed from sleep or hibernation, or otherwise powered-on. In response, BIOS 270 of host computing device 250 may generate and transmit an appropriate command to storage device 200. This command may instruct storage device 200 to optimize its operating parameters 240 for the particular configuration of computing device 250 (i.e., desktop or notebook).

Method 350 may then proceed to block 365, where storage device 200 may receive power and, in response, execute a series of instructions for initializing the device. In particular, storage device 200 may execute a firmware routine or other procedure for initiating and configuring its internal hardware components. In initializing itself, storage device 200 may configure operating parameters 240 to a corresponding set of default parameters 245. These default parameters 245 may be optimized for inclusion of storage device 200 in either a desktop or notebook computing device.

After power-on of host computing device 250 and initialization of storage device 200, method 350 may proceed to block 370, where storage device 200 may receive the command from BIOS 270. In response, storage device 200 may parse the command and determine that the received command is instructing storage device 200 to adopt a set of non-default parameters.

Method 350 may then proceed to block 375, storage device 200 may configure its operating parameters 240 to be optimized for the non-default type of device. In particular, when the default parameters 245 are optimized for a desktop computing device, storage device 200 may assume that host computing device 250 is a notebook and, in response, optimize operating parameters 240 for a notebook computing device. Conversely, when the default parameters 245 are optimized for a notebook computing device, storage device 200 may assume that host computing device 250 is a desktop and, in response, optimize operating parameters 240 for a desktop computing device. Examples of particular operating parameters 240 that may be modified in block 375 are provided in detail above in connection with modifying instructions 134, 234 of FIGS. 1 and 2. After appropriately modifying operating parameters 240 of storage device 200, method 350 may proceed to block 380, where method 350 may stop.

FIG. 4A is a block diagram of an example operation flow 400 for optimizing operating parameters 415 of a storage device 410 for a desktop computing device 430. As illustrated, a user 440 is interacting with a desktop computing device 430 that includes a storage device 410.

In block 1 of operation flow 400, user 440 may power-on desktop computing device 430, thereby triggering a boot procedure, a resume from standby, or a resume from hibernation. In block 2, BIOS 435 may execute a number of operations to configure the hardware of desktop computing device 430. One such operation may be the transmission of a storage device optimization command to storage device 410. In particular, as a specific example, BIOS 435 may prepare and transmit an ATA command with the opcode set to "0xEF," the feature field set to "0x05," and the count field set to "0xFE." According to the ATA standard, this command enables advanced power management and specifies a power consumption setting of "maximum performance."

In block 3, in response to receipt of the command by receiving instructions 422 of machine-readable storage medium 420, storage device 410 may determine that the command is a storage device optimization command instructing optimization for a desktop computing device. Accordingly, storage device 410 may trigger execution of modifying instructions 424.

In block 4, modifying instructions 424 may optimize operating parameters 415 for desktop computing device 430. In particular, modifying instructions 424 may operate on the assumption that desktop computing device 430 will remain stationary at a relatively stable temperature and that it will have a constant power source. Accordingly, modifying instructions 424 may increase performance of storage device 410 by, for example, enabling offline scanning, loosening a seek threshold setting, modifying caching algorithm parameters, and loosening head and media parameters.

FIG. 4B is a block diagram of an example operation flow 450 for optimizing operating parameters of a storage device 460 for a notebook computing device 480. As illustrated, a user 490 is interacting with a notebook computing device 480 that includes a storage device 460.

In block 1 of operation flow 450, user 490 may power-on notebook computing device 480, thereby triggering a boot procedure, a resume from standby, or a resume from hibernation. In block 2, BIOS 485 may execute a number of operations to configure the hardware of notebook computing device 480. One such operation may be the transmission of a storage device optimization command to storage device 460. In particular, as a specific example, BIOS 485 may prepare and transmit an ATA command with the opcode set to "0xEF," the feature field set to "0x05," and the count field set to "0x01." According to the ATA standard, this command enables advanced power management and specifies a power consumption setting of "minimum power consumption."

In block 3, in response to receipt of the command by receiving instructions 472 of machine-readable storage medium 470, storage device 460 may determine that the command is a storage device optimization command instructing optimization for a notebook computing device. Accordingly, storage device 460 may trigger execution of modifying instructions 474.

In block 4, modifying instructions 474 may optimize operating parameters 465 for desktop computing device 480. In particular, modifying instructions 474 may operate on the assumption that notebook computing device 480 may be exposed to varying temperatures, may change locations during use, and may run on battery at least a portion of the time. Accordingly, modifying instructions 474 may save battery life and increase reliability of storage device 460 by, for example, disabling offline scanning, tightening a seek threshold setting, modifying caching algorithm parameters, and tightening head and media parameters.

According to the foregoing, example embodiments allow for optimization of operating parameters of a storage device for either a desktop computing device or a notebook computing device based on receipt of a command in the storage device. In example embodiments, upon receipt of such a command, the storage device may reconfigure its operating parameters to be optimized for a particular type of system. In this manner, an OEM may utilize a storage device of a single form factor in both types of system, while obtaining the benefits of a device that is optimized for the type of system in which it is currently installed.

We claim:

1. A storage device comprising:
a controller; and
a non-transitory machine-readable storage medium encoded with instructions executable by the controller to cause the controller to:
receive, from a host computing device, a predetermined command instructing the storage device to modify operating parameters, the command indicating whether to modify the operating parameters of the storage device to optimize operation of the storage device for one of a desktop computing device and a notebook computing device,
modify the operating parameters of the storage device to optimize for the desktop computing device in response to the predetermined command instructing optimization for the desktop computing device; and
modify the operating parameters of the storage device to optimize for the notebook computing device in response to the predetermined command instructing optimization for the notebook computing device.

2. The storage device of claim 1, wherein:
the storage device is configured by default for the notebook computing device, and
wherein the instructions are executable by the controller to, upon receipt of the predetermined command, select a set of operating parameters optimized for the desktop computing device.

3. The storage device of claim 1, wherein:
the storage device is configured by default for the desktop computing device, and
wherein the instructions are executable by the controller to further, upon receipt of the predetermined command, select a set of operating parameters optimized for the notebook computing device.

4. The storage device of claim 1, wherein the predetermined command is selectively one of:
a first predetermined command that instructs the storage device to modify the operating parameters of the storage device for optimization for the desktop computing device, and
a second predetermined command that instructs the storage device to modify the operating parameters of the storage device for optimization for the notebook computing device,
wherein the operating parameters of the storage device are modified for optimization for the desktop computing device in response to receiving the first predetermined command, and wherein the operating parameters of the storage device are modified for optimization for the notebook computing device in response to receiving the second predetermined command.

5. The storage device of claim 1, wherein:
the predetermined command is a command defined by an Advanced Technology Attachment (ATA) standard.

6. The storage device of claim 5, wherein the predetermined command is a Set Features command defined by the ATA standard.

7. The storage device of claim 1, wherein modifying the operating parameters of the storage device performs at least one of:
enabling or disabling a background media scan (BGMS) feature,
modifying settings for a caching algorithm, and
modifying parameters for controlling heads and media of the storage device.

8. The storage device of claim 1, wherein the predetermined command contains a first value to instruct optimization for the desktop computing device, and the predetermined command contains a second value to instruct optimization for the notebook computing device.

9. A computing device comprising:
a processor;
a storage device; and
a non-transitory machine-readable storage medium encoded with Basic Input/Output System (BIOS) instructions executable by the processor to cause the processor to:
execute a power-on procedure to configure hardware of the computing device, and
transmit a predetermined command to the storage device during the power-on procedure, the command instructing the storage device to modify operating parameters of the storage device to optimize operation of the storage device for one of a desktop computing device and a notebook computing device,
wherein the storage device is configured to modify the operating parameters to optimize operation of the storage device for the desktop computing device if the predetermined command instructs optimization for the desktop computing device, and wherein the storage device is configured to modify the operating parameters to optimize operation of the storage device for the notebook computing device if the predetermined command instructs optimization for the notebook computing device.

10. The computing device of claim 9, wherein the power-on procedure is one of a boot procedure, a resume from standby, and a resume from hibernation.

11. The computing device of claim 9, wherein:
the computing device is the notebook computing device,
the storage device is configured by default to be optimized for the desktop computing device, and
the predetermined command instructs the storage device to optimize the operating parameters for the notebook computing device.

12. The computing device of claim 9, wherein:
the computing device is the desktop computing device,
the storage device uses a form factor designed for the notebook computing device and is configured by default to be optimized for the notebook computing device, and
the predetermined command instructs the storage device to optimize the operating parameters for the desktop computing device.

13. The computing device of claim 9, wherein the predetermined command contains a first value to instruct optimization for the desktop computing device, and the predetermined command contains a second value to instruct optimization for the notebook computing device.

14. A method for optimizing operating parameters of a storage device coupled to a host computing device, the method comprising:
receiving, in the storage device, a predetermined command from the host computing device, the command instructing the storage device to modify operating parameters to optimize operation of the storage device for the host computing device, wherein the host computing device is one of a desktop computing device and a notebook computing device;
modifying the operating parameters of the storage device for optimization for a desktop computing device if the predetermined command instructs optimization for a desktop computing device; and
modifying the operating parameters of the storage device for optimization for a notebook computing device if the predetermined command instructs optimization for a notebook computing device.

15. The method of claim 14, wherein a Basic Input/Output System of the host computing device issues the predetermined command during one of a boot procedure, a resume from standby, and a resume from hibernation.

16. The method of claim 14, wherein:
the storage device is configured by default for a particular type of computing device, wherein the particular type is one of the notebook computing device and the desktop computing device, and
upon receipt of the predetermined command, the storage device selects a set of operating parameters optimized for a non-default type of computing device that is another one of the notebook computing device and the desktop computing device.

17. The method of claim 14, wherein the predetermined command is selectively one of:
a first predetermined command that instructs the storage device to modify the operating parameters of the storage device for optimization for the desktop computing device, and
a second predetermined command that instructs the storage device to modify the operating parameters of the storage device for optimization for the notebook computing device,
wherein the operating parameters of the storage device are modified for optimization for the desktop computing device in response to receiving the first predetermined command, and wherein the operating parameters of the storage device are modified for optimization for the notebook computing device in response to receiving the second predetermined command.

18. The method of claim 14, wherein the predetermined command contains a first value to instruct optimization for the desktop computing device, and the predetermined command contains a second, different value to instruct optimization for the notebook computing device.

* * * * *